United States Patent
Moore et al.

(10) Patent No.: US 7,245,107 B2
(45) Date of Patent: Jul. 17, 2007

(54) SYSTEM AND METHOD FOR BATTERY CHARGE CONTROL BASED ON A CYCLE LIFE PARAMETER

(75) Inventors: Stephen W. Moore, Fishers, IN (US); Brad T. Hanauer, Muncie, IN (US); Peter J. Schneider, Carmel, IN (US)

(73) Assignee: Enerdel, Inc., ForttLauderdale, FL (US)

( * ) Notice: Subject to any disclaimer, the term of this patent is extended or adjusted under 35 U.S.C. 154(b) by 0 days.

(21) Appl. No.: 10/434,940

(22) Filed: May 9, 2003

(65) Prior Publication Data
US 2004/0222768 A1 Nov. 11, 2004

(51) Int. Cl.
*H02J 7/00* (2006.01)
(52) U.S. Cl. .................................. 320/112
(58) Field of Classification Search ............ 320/112, 320/104, 103, 107, 137; 429/161, 192, 231.8
See application file for complete search history.

(56) References Cited

U.S. PATENT DOCUMENTS

| | | | | |
|---|---|---|---|---|
| 4,606,350 A * | 8/1986 | Frost | ............ | 607/29 |
| 5,694,021 A * | 12/1997 | Morioka et al. | ............ | 320/106 |
| 5,839,816 A | 11/1998 | Varga et al. | ............ | 362/153.1 |
| 6,063,519 A | 5/2000 | Barker et al. | ............ | 429/161 |
| 6,083,912 A | 7/2000 | Khouri | ............ | 429/231.8 |
| 6,191,590 B1 | 2/2001 | Klutz et al. | ............ | 324/428 |
| 6,194,874 B1 * | 2/2001 | Kalogeropoulos et al. | .. | 320/160 |
| 6,291,097 B1 | 9/2001 | Barker et al. | ............ | 429/161 |
| 6,300,763 B1 | 10/2001 | Kwok | ............ | 324/427 |
| 6,406,815 B1 | 6/2002 | Sandberg et al. | ...... | 429/231.95 |
| 6,413,668 B1 | 7/2002 | Sandberg et al. | ............ | 429/174 |
| 6,419,712 B1 | 7/2002 | Haverstick | ............ | 29/623.4 |
| 6,456,042 B1 | 9/2002 | Kwok | ............ | 320/134 |
| 6,495,992 B1 * | 12/2002 | Pavlovic | ............ | 320/161 |
| 6,617,078 B1 | 9/2003 | Chia et al. | ............ | 429/316 |
| 6,636,020 B1 * | 10/2003 | Ronald | ............ | 320/134 |
| 6,744,238 B2 * | 6/2004 | Davis et al. | ............ | 320/128 |
| 6,765,389 B1 * | 7/2004 | Moore | ............ | 324/430 |
| 7,005,830 B2 * | 2/2006 | Moore et al. | ............ | 320/104 |
| 2004/0012369 A1 * | 1/2004 | Moore et al. | ............ | 320/104 |

OTHER PUBLICATIONS

Buchmann I.,How to prolong lithium-based batteries@http://www.elecdesign.com/Articles/ArticleID/6185/6185.html, Feb. 2003, pp. 1-4.*
IEEE, 7th edition, 2000, p. 155.*

* cited by examiner

*Primary Examiner*—Pia Tibbits
(74) *Attorney, Agent, or Firm*—Howard & Howard Attorneys, P.C.

(57) ABSTRACT

A charging and discharging strategy for a rechargeable battery pack is disclosed. The strategy involves monitoring and learning the battery pack's condition (a cycle life parameter) in terms of its progression through its life cycle. The life cycle parameter may be determined as a function of both time (i.e., the battery pack's age) as well as the number of discharge/recharge cycles. The strategy intentionally under-utilizes the battery during the initial stages of its life, based on the cycle life parameter, by charging it to a first level less then the maximum state of charge. This approach reduces charge voltages, reducing stress on the battery's active materials, thereby increasing its life.

7 Claims, 2 Drawing Sheets

SYSTEM AND METHOD FOR BATTERY CHARGE CONTROL BASED ON A CYCLE LIFE PARAMETER

BACKGROUND OF THE INVENTION

1. Technical Field

The invention relates generally to energy-based systems, and in particular to a method and system for battery charge control based on a cycle life parameter.

2. Discussion of the Background Art

It is known to provide energy storage in the form of lithium chemistry batteries, as seen by reference to U.S. Pat. No. 6,063,519 to Barker et al. One characteristic of lithium chemistry batteries is that they have less tolerance to overcharging than the other battery technologies, such as nickel metal hydride (NiMH), lead acid (PbA) and nickel cadmium (NiCd) technologies. For example, heat may be generated due to overcharging, which may seriously impair or damage the battery. Another characteristic of lithium batteries is that the available capacity (e.g., watt-hours) varies as a function of a charge voltage. That is, current is passed through the battery when recharging, and the battery output voltage increases in response thereto. The charge voltage is the voltage at which charging is stopped. However, lithium batteries degrade with respect to capacity (e.g., watt-hours) with increasing charge voltages. This is due, in part, to the stress imposed on the cells, which increases with increasing voltage. While it is possible to charge lithium batteries to lower charge voltages, to ostensibly reduce stress, the downside is that the battery will have a reduced usable capacity.

Regarding charging regimens, it is known to provide a battery charger that provides the same charge to the battery every time. It is also known to provide a battery charger that adjusts a charging function based on changes in temperature and/or voltage, but such charging function remains constant through the life of the battery. It is also known to provide a charging regimen that inhibits both overcharging as well as deep discharging, as seen by reference to U.S. Pat. No. 5,839,816 to Varga et al. entitled ROAD MARKER. Varga et al disclose a battery-powered road marker, which includes a battery management feature for a NiCd battery such battery management feature inhibits charging when the battery output voltage reaches an upper limit to prevent overcharging and possible outgassing. Varga et al. further disclose another feature wherein all discharge is inhibited in the event that the battery system reaches a predetermined, lowest safe output voltage to prevent deep discharge of the battery. The battery management features disclosed in Varga et al. do not appear to change during the life of the battery system. However, some types of battery packs, generally, and lithium batteries in particular, change significantly with respect to capacity during its life cycle.

SUMMARY OF THE INVENTION

An object of the present invention is to solve one or more of the problems as set forth above. One advantage of the present invention is that it allows dynamic adaptation of a charging strategy for a rechargeable lithium battery based on a cycle life parameter, thereby lengthening the useful life of the battery. In a preferred embodiment, a method of charge control involves under-utilizing the available capacity of the battery by charging in accordance with a reduced charge voltage during early stages so as to extend its cycle life. This under-utilization is progressively phased out as the battery degrades (i.e., degrades with respect to capacity) until a condition is reached where full utilization of the battery is needed. In the context of the present invention, under-utilization involves not fully charging the battery and not fully discharging the battery. The extent of the under-utilization is based on a cycle life parameter calculated for the battery.

These and other features, objects and advantages are realized by the present invention, which includes a method of charge control of a battery pack comprising the step of reserving a charging headroom that is based on a cycle life parameter of the battery pack. The method may further includes the steps of determining the cycle life parameter as a function of (i) time or age of the battery pack and (ii) a number of charge/discharge cycles of the battery pack; and, charging the battery pack to a first level corresponding to a maximum state of charge (SOC) for the battery pack less the reserved charging headroom. In a preferred embodiment, the method may further include yet another step of allowing discharge of the battery pack while the state of charge of the battery pack exceeds a second level, the second level corresponding to a completely discharged level increased by an amount that is also based on the cycle life parameter mentioned above.

A rechargeable battery pack according to the invention is also presented.

BRIEF DESCRIPTION OF THE DRAWINGS

The present invention will now be described by way of example, with reference to the accompanying drawings.

DETAILED DESCRIPTION OF THE PREFERRED EMBODIMENTS

Figure 1:
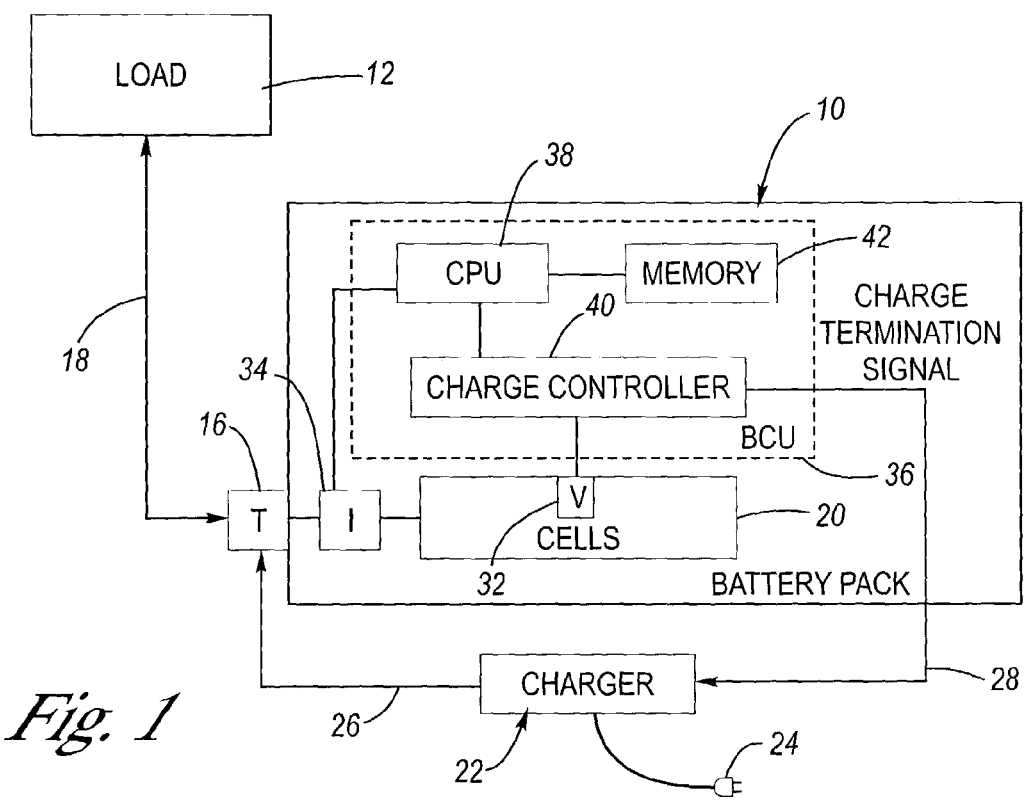
FIG. 1 is a simplified schematic and block diagram view of an battery pack according to the present invention, in an exemplary embodiment.

Referring now to the drawings wherein like reference numerals are used to identify identical components in the various views, FIG. 1 is a simplified, schematic and block diagram view of an inventive battery pack 10 according to the invention. Battery pack 10 is suitable for use in connection with any one or more of a plurality of exemplary loads 12. Load 12 may be passive, that is, adapted to consume power only, or may be active, adapted to both consume power in one mode, and produce power in a second mode. For example, an active load may include a dynamoelectric machine (not shown), which may alternatively be configured for operation (i) in a first mode wherein the machine draws power and is used for propulsion torque, or (ii) in a second mode different from the first mode wherein the machine is configured for the production of regenerative energy—it is configured as a generator. As to the latter, active load, for example, such applications may include, but are not limited to, self-propelled vehicle applications, although other applications which are stationary in nature (i.e., rotating systems having loads with inertia) are also included within the spirit and scope of the invention. As is known, a dynamoelectric machine may comprise conventional apparatus known to those in the art, for example only, AC or DC electric motors, brush-based or brushless electric motors, electromagnet or permanent magnetic based electric motors, reluctance-based electric motors, or the like. It should be clearly understood that the foregoing is exemplary only and not limiting in nature.

The present invention includes the means for using the extra capacity present in battery pack 10 to optimize the charge regimen applied to the battery pack 10 so as to achieve a longer life. Achieving maximum performance and maximum service life for a battery pack, such as a lithium battery system, are potentially conflicting goals with regard to charging strategy. As background, a battery pack 10 is generally produced having excess capacity (i.e., relative to the intended application or consumption presented by load 12). This excess capacity is provided in the expectation that the battery pack capacity and performance will degrade over the life of the battery pack, due both to the passage of time as well as due to charge/discharge cycling. Conventional charging strategies are generally implemented using increased charge voltages (i.e., increased voltage at which charging is terminated), sometimes as adjusted for temperature or current, to maximize capacity (e.g., watt-hours). However, the increased charge voltages tend to increase the stress on the active materials of the battery, particularly for lithium chemistry battery systems (e.g., lithium ion batteries). This stress tends to shorten the life of the battery. Conventional charging strategies thus represent a compromise: near term capacity in exchange for a shortened useful life.

In accordance with the present invention, while battery pack 10 is relatively new and the above-described degradation has not occurred fully, such built-in excess capacity can be reserved by implementing a partial charging strategy. Partially charging the battery pack can be accomplished by employing a reduced charge termination voltage, which in turn reduces the stress on the active materials in the battery pack. The reduced stress is operative to lengthen the useful life of the battery pack. As the capacity and performance of the battery pack degrades generally due to the passage of time and charge/discharge cycling, the invention is operative to increase the charge termination voltage to compensate for such influence. In one embodiment, the degree of compensation is selected so as to maintain a substantially constant capacity delivery over the longest period of time possible. When the battery pack degrades such that no excess capacity remains (i.e., "excess," again, relative to the requirements of the load/expectations of the user), the invention adjusts the charge termination voltage to maximize capacity/performance.

With continued reference to FIG. 1, battery pack 10 may include an input/output terminal 16, designated "T" (for Terminal) in the drawings. A power bus 18 is configured to allow electrical power to be drawn for battery pack 10 to be provided to load 12. To the extent that load 12 comprises regenerative power capabilities, power bus 18 may alternatively be configured or used to carry electric energy, hereinafter referred to as regenerative energy, produced by such active load 12 when operated in a regenerative energy production mode.

FIG. 1 also shows an electrical battery charger 22, including in exemplary fashion a conventional electrical plug for connection to a wall outlet (not shown) or the like. Charger 22 is configured for charging (or recharging) battery pack 10. Charger 22 includes a charging power line 26 configured for connection to battery pack 10 for charging (or recharging) the battery cells thereof, although for simplicity sake, line 26 is shown connected to the I/O terminal 16. In addition, charger 22 may have an input configured to receive a control signal, such as a charge termination signal, on a control line 28 from battery pack 10. The charge termination signal on line 28 is configured to cause charger 22 to discontinue charging battery pack 10 (i.e., to stop charging), for example, when the battery pack 10 has been charged to a calculated level according to the invention, as described in greater detail below. Alternatively, charger 22 may be variable charger 22 wherein the control signal on line 28 is operative to adjust the charging current as well as to terminate the charge current. Charger 22 may comprise conventional charging componentry known to those of ordinary skill in the art.

In the illustrated embodiment, battery pack 10 includes one or more battery cells 30, at least one voltage sensor 32, at least one current sensor 34 and a battery control unit (BCU) 36. BCU 36 may include a means for calculating a charge level, such as central processing unit (CPU) 38, a charge controller 40, and a memory 42.

Cells 30 are configured to produce electrical power, and may be arranged so that the collective output thereof is provided on I/O terminal 16, as in the illustrated embodiment. Conventional electrical current flows out of terminal 16 to the load 12. Cells 30 are also configured to be rechargeable, for example, by receiving conventional electrical current into battery pack 10 at I/O terminal 16. The recharging current may be from either charger 22 or, in the case where load 12 is an active load having regenerative power capability, from load 12. In a preferred embodiment, cells 30 comprise cells formed in accordance with various Lithium chemistries known to those of ordinary skill in the energy storage art, such as lithium ion, lithium polymer, lithium sulfur or the like. However, generally, cells 30 may comprise conventional apparatus according to known battery technologies, for example, NiMH, PbA, or NiCd, or the like. In the illustrated embodiment, cells 30 are arranged to produce a direct current (DC) output at a predetermined, nominal level (e.g., 80 volts at 100% of full state of charge).

Voltage sensor 32 is configured to detect a voltage level and produce a voltage indicative signal representative of the detected voltage. In one embodiment, one voltage sensor 32 is provided to detect the overall voltage output of the combination of cells 30. In a preferred embodiment, however, a plurality of voltage sensors 32 (the plurality not being shown for clarity) are employed, at least one for each individual cell included in battery pack 10. Through the foregoing multiple sensor approach, advanced diagnostics and charging strategies may be implemented, as understood by those of ordinary skill in the art. Voltage sensor(s) 32 may comprise conventional apparatus known in the art.

Current sensor 34 is configured to detect a current level and polarity of the electrical (conventional) current flowing out of (or into) battery pack 10 via terminal 16, and generate in response a current indicative signal representative of both level and polarity. Current sensor 34 may comprise conventional apparatus known in the art. In the preferred embodiment, the current sensor 34 is used to monitor operating characteristics, particularly, to determine whether current is flowing into the battery pack, among other things.

Battery Control Unit (BCU) 36 is configured for controlling the overall operation of battery pack 10, including the adjustments to the charging strategy according to the invention. BCU 36 may include a central processing unit (CPU) 38, a charge controller 40, and a memory 42.

CPU 36 may comprise conventional processing apparatus known in the art, capable of executing preprogrammed instructions stored in memory 42, all in accordance with the functionality as described in greater detail below. In this regard, memory 42 is coupled to CPU 36, and may comprise conventional memory devices, for example, a suitable combination of volatile, and non-volatile memory so that main line software can be stored and further allow processing of dynamically produced data and/or signals.

Charge controller 40 is also coupled to CPU 38, and is configured so as to allow CPU 38 to adjust a charge termination voltage according to the invention, such that when the actual voltage level from sensor(s) 32 reach the calculated charge termination voltage, controller 40 generates the above-mentioned charge termination signal on line 28. This control signal is operative to shut down external charger 22, as described above. Charge controller 40 may be configured as a separate unit or circuit, as illustrated, or may be implemented in software executed on CPU 38.

Figure 2:
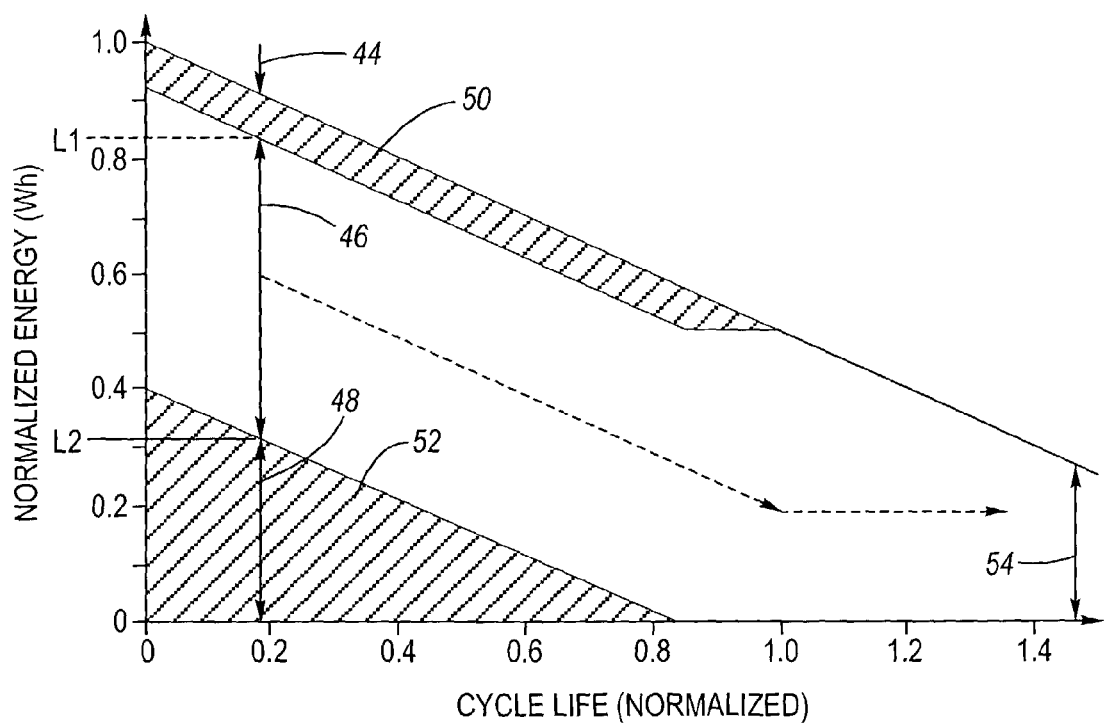
FIG. 2 is a simplified diagram showing how the present invention reserves charge headroom with respect to capacity during early stages so as to extend the overall useful life thereof.

FIG. 2 is a simplified chart showing charging control established by the present invention configured to extend battery life. In FIG. 2, the vertical or Y-axis corresponds to the capacity of the battery pack 10, designated in normalized energy units (e.g., watt-hours). The value "1" on the Y-axis designates the manufactured capacity for battery pack 10, some of which the user may be restricted from using. The amount 46, on the other hand, may correspond to a requirement of the load and/or an expectation of the user of the load. The horizontal or X-axis corresponds to the normalized cycle life of battery pack 10. The cycle life axis represents the cumulative effect of both aging (e.g., elapsed time) and use (e.g., the number of charge/discharge cycles). For example, two otherwise identical battery packs that are one-year old and two-years old, respectively, but having undergone 100 and 40 charge/discharge cycles, respectively, may nonetheless have about the same cycle life characteristics. The value "1" on the X-axis designates the "normal" expected cycle life of battery pack 10 which, again, may correspond to a requirement of the load or expectation of the user.

FIG. 2 also shows a charge headroom capacity amount 44, a nominal battery pack capacity 46, and a reserve, lower discharge capacity amount 48. FIG. 2 also shows an upper area 50 restricted from use, a lower area 52 restricted from use, and an end of life (EOL) capacity 54.

With continued reference to FIG. 2, as described above, lithium batteries are subject to increased levels of stress with progressively increasing charge termination voltages. The method and apparatus in accordance with the present invention observes and "learns" the battery's present, run-time condition, particularly the degree of degradation due to the passage of time and through the number of charge/discharge cycles it has undergone, and produces a cycle life parameter. The cycle life parameter is a parameter indicative of the level of degradation of battery pack 10 over its life time, and may be determined by CPU 38 configured through software, as a function of (i) internal impedance and/or (ii) time or age of the battery pack; and/or (iii) the number of charge/discharge cycles the battery pack 10 has undergone or any combination thereof. Other approaches for ascertaining a battery's condition (i.e., capacity degradation) are known in the art and the invention is not limited to any particular approach for determining capacity degradation. In turn, CPU 38, configured through software, defines the means for determining the charge headroom capacity amount 44. CPU 38 configured through software is further arranged to determine a first level, designated L1 in FIG. 2, which corresponds to a maximum state of charge less the calculated, reserved charge headroom 44. CPU 38 determines the first charge level L1 as a function of the cycle life parameter.

In addition, CPU 38 configured through software is arranged to allow discharge while the state of charge of the battery pack 10 exceeds a second level, designated L2 in FIG. 2. The second level corresponds to a complete discharge level (i.e., "zero") increased by an amount 48 that is again based on the cycle life parameter. Both the first and second levels L1 and L2 are determined based on the cycle life parameter, and change, as shown in the illustrated embodiment, as the cycle life parameter progresses in value from zero through a value of 1.0 and beyond. Restricted areas 50 and 52 represent conditions of charge and discharge that are disallowed according to the methodology of the present invention. Regarding the upper, restricted area 50, such area is disallowed so as to avoid increased charge termination voltage levels. Reducing the charge voltages reduce stress on the active materials in battery pack 10, thereby extending its useful life. In addition, lower restricted area 52 is disallowed so as to prevent a deep discharge of battery pack 10, and further, to allow for a more uniform battery pack capacity availability. In one embodiment, the first level L1 and the second level L2 are selected so as to regulate the available capacity (i.e., the capacity 46 shown in FIG. 2) to a substantially uniform level over the majority of the cycle life of battery pack 10. As shown in FIG. 2, the nominal or rated capacity 46 is available from the beginning of the cycle life of battery pack 10, and is available substantially to the condition when the normalized cycle life parameter is equal to 1.0 (i.e., over the nominal cycle life of the battery pack). As illustrated in FIG. 2, further degradation of the battery pack 10 results in a reduced capacity to the point where, for example, an end of life (EOL) capacity 54 is reduced relative to the nominal capacity 46.

Figure 3:
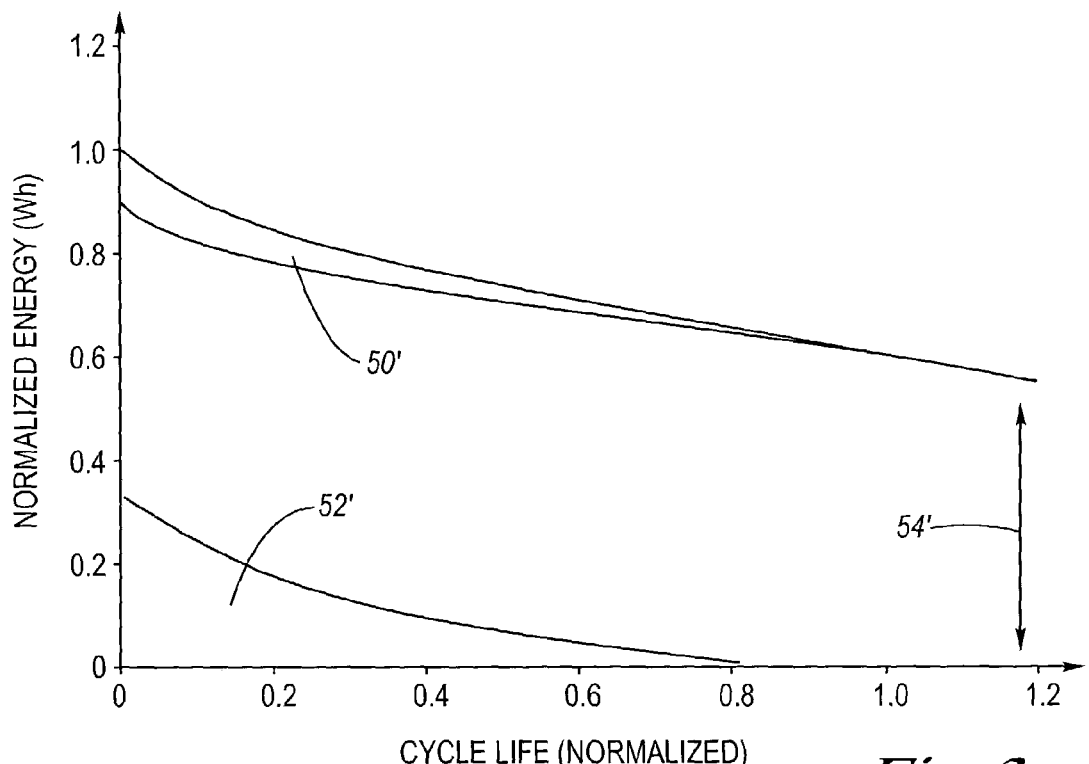
FIG. 3 is a simplified diagram illustrating a cycle life decay for a typical battery pack.

FIG. 3 is a simplified diagram illustrating a cycle life decay for a typical lithium battery pack. In particular, rather than the triangle and/or trapezoidal restricted areas 50, and 52 shown in FIG. 2, more realistic restricted areas 50' and 52' are shown with edge boundaries having sloping curves. In addition, FIG. 3 shows an end of life capacity 54'.

Referring now to FIGS. 1-4, a method in accordance with the present invention will now be set forth. It should be understood that the following functionality, unless specifically described with respect to a particular structure of the illustrated embodiment of FIG. 1, or which has already been specifically described in connection with a specific structure of FIG. 1, may be implemented in software suitable for execution by CPU 38.

Figure 4:
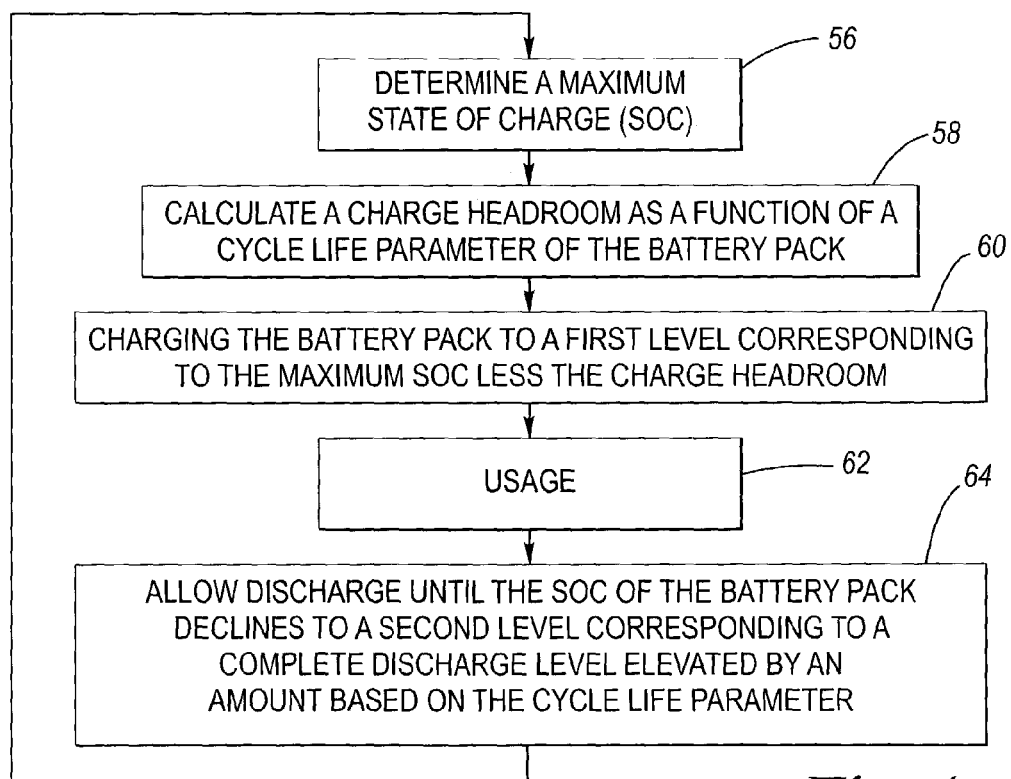
FIG. 4 is a simplified flowchart showing a method according to the present invention.

Referring specifically to FIG. 4, it is assumed that the battery pack 10 is activated with a "full" battery charge. In the context of the present invention, and of the diagram in FIG. 2 and the flowchart of FIG. 4, "full" will take on differing values to reflect the ever-changing cycle life parameter as the battery pack ages, and undergoes charging/discharging cycles. For example, the charging default from the "factory" when the battery pack is new may be set, as illustrated in exemplary fashion in FIG. 2, at a value slightly above 90% of the maximum state of charge. The "full" battery charge level, namely the first level L1, will vary as the method iterates through both time, and charging/discharging cycles. The charging strategy according to the invention "learns" the condition of the battery pack 10. If extremely frequent charge/discharge cycles occur when the battery pack is relatively new, this will advance the progression along the cycle life parameter axis (i.e., the X-axis in FIG. 2) compared to a reduced frequency of charge/discharge cycles.

Referring again to FIG. 4, in step 56, the method determines a maximum state of charge (SOC) of the battery pack, and in step 58, a charge headroom 44 is calculated. In one embodiment, the charge headroom 44 is determined as a function of the life cycle parameter of the battery pack. In an alternate embodiment, the maximum state of charge may be determined using the cycle life parameter, wherein the reserved charge headroom 44 is calculated arithmetically in order to maintain battery pack capacity 46 at a substantially uniform level over the cycle life of the battery pack 10. The method proceeds to step 60.

In step 60, the method involves charging the battery pack to first level L1, which corresponds to the maximum state of charge less the charge headroom 44. In one embodiment, step 60 includes a substep performed by CPU 38, which is configured to calculate a charge termination voltage. This is the physical voltage threshold that corresponds to the first level L1, and also corresponds to the reserved charge headroom 44 below the maximum state of charge. The determined charge termination voltage level may be supplied to charge controller, as described above. Charge controller 40 is then configured to control charging to such level, and may generate the charge termination signal, also as described above.

The selection of the charge termination voltage, based on the first level L1 may be implemented using an equation, or, alternatively, a look-up table (LUT). For example, a battery pack 10 having lithium chemistry cells may output 80 volts when 100% fully charged, and output close to 66 volts when close to 0% charged. The progression between 0% and 100% state of charge is nearly linear between 66 volts and 80 volts. A straight line equation can be predetermined to calculate the relationship between state of charge level and charge termination voltage. Once a suitable first charge level L1 has been determined (e.g., percentage of the maximum state of charge), then, in one embodiment, it is a relatively straightforward task in calculating a charge termination voltage.

One objective indicia of cycle life may involve the impedance of the battery pack, that electrical characteristic that presents a resistance to charging. It is known that certain temperature conditions may affect the impedance (i.e., a cold battery will have an increased impedance relative to a battery at ambient, room temperature). However, an "old" battery, either chronologically, or based on the number of times the battery pack has gone through a discharge/recharge cycle, may also exhibit an increased impedance. The term increased is a relative term, and is used in reference to a new battery pack 10 existing at a normal, ambient room temperature. Battery impedance is but one parameter that may be used in determining the above-mentioned cycle life parameter of a battery pack in accordance with the present invention. The cycle life parameter may therefore be determined through the look up of preprogrammed values for and at different "age" and discharge/recharge cycle progressions, or dynamically through real-time measurements of the battery impedance in accordance with a so-called battery state estimator. There are a number of battery state estimator approaches known in the art, and which may be suitable for use in the present invention.

According to the invention, a charging control is established that under-utilizes the capacity of a battery pack formed upon lithium cells.

It should be appreciated that while the charge termination voltage has been described with respect to an overall output voltage of the battery pack, in an alternate embodiment, it is taken with respect to the individual cells of the battery pack 10. In particular, battery pack 10 includes a plurality of cells 30. The charging of each cell, for example in a lithium chemistry battery pack, is controlled. It should therefore be understood that one cell in the battery pack may be at a higher voltage than the others wherein the whole charging process is terminated when the limit has been reached for that particular cell. Thus, the charge termination voltage should be understood to apply to either the overall output voltage of the battery pack, or, to one or more particular cells within the battery pack, or some combination of the foregoing, all as the circumstances of the particular battery pack and cells being used may require.

As an extension of the foregoing, the charge termination voltage may be provided to charge controller 40, as described above. The remainder of step 60 involves charging the battery pack using the calculated charge termination voltage, which in turn corresponds to the first charge level L1 (maximum state of charge less the reserved charge headroom, all based on the cycle life parameter). The method then proceeds to step 62.

In step 62, the achieved state of charge level L1 of the battery pack 10 is utilized by load 12 by way of power bus 18. This usage begins to drain or discharge battery pack 10. The method then proceeds to step 64.

In step 64, the control of the present invention allows discharge of the battery pack until the state of charge thereof declines to a second level L2. The second level L2 corresponds to a completely discharge level (i.e., zero) elevated by an amount 48 based also on the cycle life parameter. In the illustrated embodiment, the foregoing described under-utilization on both the charging and discharging sides allows regulation of the battery pack to a substantially uniform battery capacity. The relative uniformity with respect to capacity may be tailored based on appropriate selection of first and second charge and discharge levels L1 and L2. A non-uniform, but predetermined, capacity profile may also be possible.

The process then returns to the beginning of the method, wherein the method steps previously described are repeated.

According to the invention, a charging control is established that under-utilizes the capacity of a battery pack formed upon lithium cells. This intentional under-utilization involves charging the rechargeable battery pack to reduced voltage levels, which reduces stress on the active materials, thereby increasing its life. The amount of the under-utilization is based on the condition of the battery, which changes throughout the battery's cycle life. The particular level of under-utilization is based thus on calculated cycle life parameter.

The invention claimed is:

1. A method of adaptive charge control of a battery pack, comprising the steps of:
   (a) determining at least one of a cycle life parameter and a maximum state of charge of said battery pack, said cycle life parameter and maximum state of charge varying during a lifetime of said battery pack;
   (b) calculating a charge headroom from said life cycle parameter or said maximum state of charge;
   (c) determining a charge termination voltage level for charging said battery pack based on said maximum state of charge minus said charge headroom;
   (d) adaptively and only partially charging the battery pack to a first level defined by said charge termination voltage, wherein said first level is less than said maximum state of charge, said charging being terminated before said battery pack is fully charged, and (e) during said lifetime of said battery repeating steps (a)-(d), wherein said first level of said battery pack is changed based on a condition of said battery pack, and (f) allowing discharge while the state of charge of the battery pack exceeds a second level corresponding to a complete discharge level increased by an amount that is based on the cycle life parameter.

2. The method of claim 1, wherein said charge termination voltage is increased over said lifetime of said battery pack to compensate for reduction in said maximum state of charge.

3. The method of claim 1, wherein said life cycle parameter is determined based on measurement of an internal impedance of said battery pack.

4. The method of claim 1, wherein said battery pack comprises are lithium cells.

5. A method of charging a battery pack, including the steps of:

reserving a charge headroom to define a first charge level based on a cycle life parameter of the battery pack; and charging the battery pack to the first level corresponding to a maximum state of charge less the reserved charge headroom; and, allowing discharge while the state of charge of the battery pack exceeds a second level corresponding to a complete discharge level increased by an amount that is based on the cycle life parameter.

6. A method of adaptive charge control of a battery pack, comprising the steps of:

(a) determining at least one of a cycle life parameter and a maximum state of charge of said battery pack, said cycle life parameter and maximum state of charge varying during a lifetime of said battery pack;

(b) calculating a charge headroom from said life cycle parameter or said maximum state of charge;

(c) determining a charge termination voltage level for charging said battery pack based on said maximum state of charge minus said charge headroom;

(d) adaptively and only partially charging the battery pack to a first level defined by said charge termination voltage, wherein said first level is less than said maximum state of charge, said charging being terminated before said battery pack is fully charged, and (e) allowing discharge while the state of charge of the battery pack exceeds a second level corresponding to a complete discharge level increased by an amount that is based on the life cycle parameter.

7. A method of charge control of a battery pack, comprising the steps of:

reserving a charge headroom to define a first charge level based on a cycle life parameter of the battery pack, said first level being a partially charged level;

charging the battery pack to the first level corresponding to a maximum state of charge less the reserved charge headroom, wherein said charging step is terminated before said battery pack is fully charged;

determining said cycle life parameter as a function of a condition of capacity degradation, wherein the capacity degradation is caused by (i) time and (ii) a number of charge cycles of the battery pack;

allowing discharge while the state of charge of the battery pack exceeds a second level corresponding to a complete discharge level increased by an amount that is based on the cycle life parameter; and selecting the first level and second level so as to regulate uniform capacity of the battery pack over a cycle life thereof.

* * * * *